United States Patent
Setomoto et al.

(10) Patent No.: US 10,264,655 B2
(45) Date of Patent: Apr. 16, 2019

(54) LUMINAIRE, LIGHTING SYSTEM, AND PAIRING METHOD IN LIGHTING SYSTEM

(71) Applicant: PANASONIC INTELLECTUAL PROPERTY MANAGEMENT CO., LTD., Osaka (JP)

(72) Inventors: Tatsumi Setomoto, Osaka (JP); Kentaro Yamauchi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/954,168

(22) Filed: Apr. 16, 2018

(65) Prior Publication Data
US 2018/0317302 A1 Nov. 1, 2018

(30) Foreign Application Priority Data
Apr. 27, 2017 (JP) ................................ 2017-088861

(51) Int. Cl.
| | |
|---|---|
| *H05B 37/02* | (2006.01) |
| *F21V 15/01* | (2006.01) |
| *F21V 23/04* | (2006.01) |
| *F21S 8/04* | (2006.01) |
| *H04R 1/02* | (2006.01) |
| *H04R 29/00* | (2006.01) |
| *G10L 25/51* | (2013.01) |
| *G10K 11/178* | (2006.01) |
| *F21V 3/04* | (2018.01) |
| *F21Y 115/10* | (2016.01) |

(52) U.S. Cl.
CPC ............ *H05B 37/0236* (2013.01); *F21S 8/04* (2013.01); *F21V 3/049* (2013.01); *F21V 15/01* (2013.01); *F21V 23/0435* (2013.01); *F21V 23/0471* (2013.01); *G10K 11/17823* (2018.01); *G10L 25/51* (2013.01); *H04R 1/028* (2013.01); *H04R 29/004* (2013.01); *H05B 37/0272* (2013.01); *F21Y 2115/10* (2016.08)

(58) Field of Classification Search
None
See application file for complete search history.

(56) References Cited

U.S. PATENT DOCUMENTS

| | | |
|---|---|---|
| 2010/0029205 A1* | 2/2010 | Lu .......................... H04L 63/08 455/41.2 |
| 2011/0022396 A1 | 1/2011 | Van De Sluis et al. |

(Continued)

FOREIGN PATENT DOCUMENTS

| | | |
|---|---|---|
| JP | 2010-525538 A | 7/2010 |
| JP | 2015-504520 A | 2/2015 |

(Continued)

*Primary Examiner* — Jany Richardson
(74) *Attorney, Agent, or Firm* — McDermott Will & Emery LLP

(57) ABSTRACT

A luminaire includes a light source; a storage for storing sound wave data which is predetermined; a microphone that detects sound; a communication circuit that communicates with a master controller; and a controller that performs pairing of the luminaire with the master controller via the communication circuit. The controller obtains sound wave data from the sound detected by the microphone, and performs the pairing when the sound wave data obtained matches the sound wave data stored in the storage.

4 Claims, 10 Drawing Sheets

(56) References Cited

U.S. PATENT DOCUMENTS

| | | |
|---|---|---|
| 2014/0001963 A1 | 1/2014 | Chobot et al. |
| 2014/0167620 A1 | 6/2014 | Chobot |
| 2014/0333206 A1* | 11/2014 | Simons .............. H05B 37/0218 |
| | | 315/132 |
| 2016/0255697 A1* | 9/2016 | Bhide ....................... H02J 9/06 |
| | | 315/161 |
| 2017/0288786 A1* | 10/2017 | Al-Mousa .............. H04B 11/00 |

FOREIGN PATENT DOCUMENTS

| | | |
|---|---|---|
| JP | 2016-506050 A | 2/2016 |
| JP | 2016-509738 A | 3/2016 |

\* cited by examiner

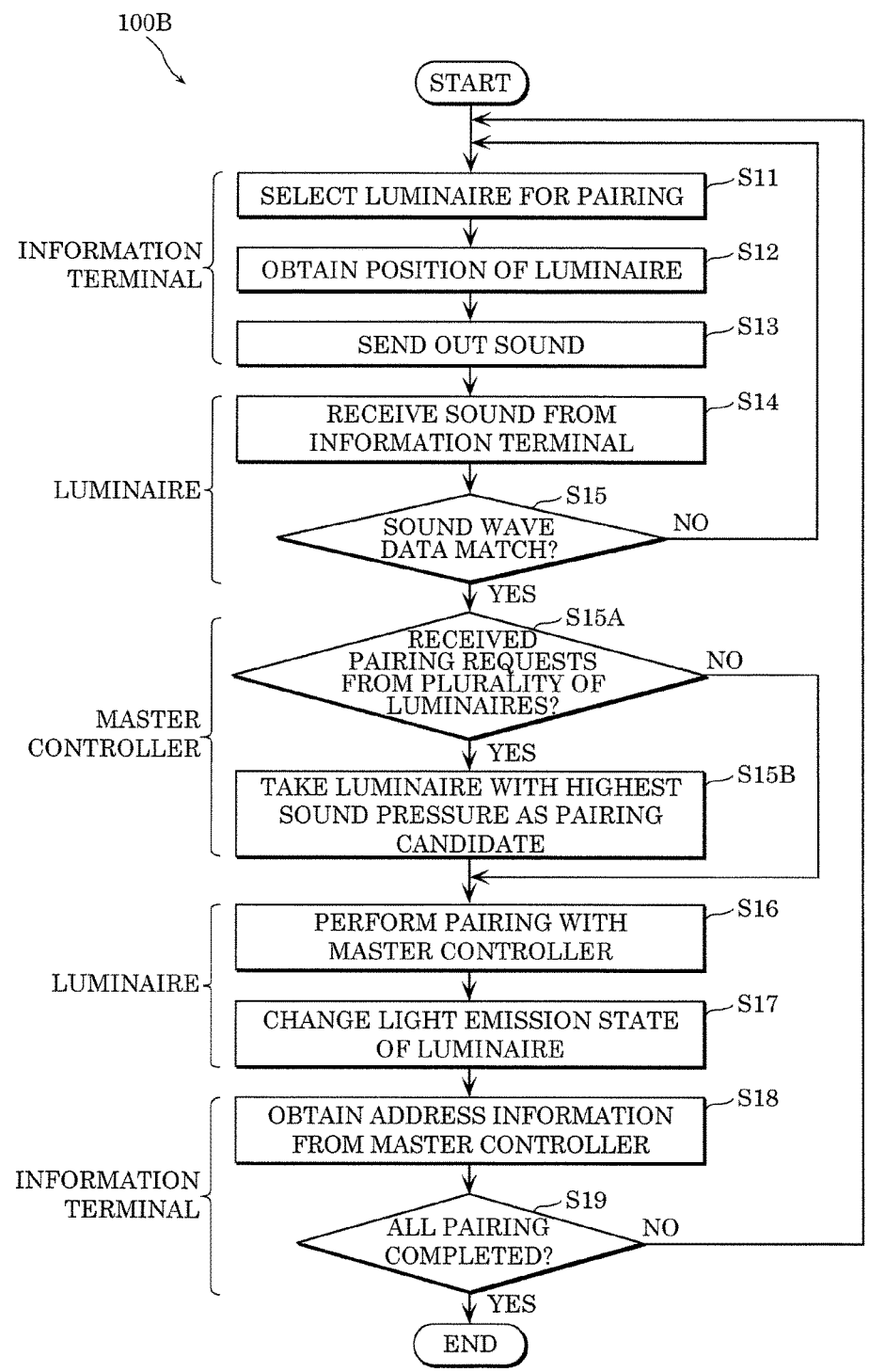

LUMINAIRE, LIGHTING SYSTEM, AND PAIRING METHOD IN LIGHTING SYSTEM

CROSS REFERENCE TO RELATED APPLICATION

This application claims the benefit of priority of Japanese Patent Application Number 2017-088861 filed on Apr. 27, 2017, the entire content of which is hereby incorporated by reference.

BACKGROUND

1. Technical Field

The present disclosure relates to a luminaire, a lighting system including the luminaire, and a pairing method in the lighting system.

2. Description of the Related Art

A lighting system that controls the light emission of a luminaire is conventionally known. As an example of this type of lighting system, Japanese Unexamined Patent Application Publication (Translation of PCT Application) No. 2010-525538 discloses a system that automatically renders a lighting atmosphere. In this system, for example, a command for acquiring an image displayed on a display is received through infrared communication from a remote control, and the acquired image is used in the automatic rendering of the lighting atmosphere.

SUMMARY

In the system disclosed in Japanese Unexamined Patent Application Publication (Translation of PCT Application) No. 2010-525538, however, the command is received through infrared communication, and thus, when a structure that blocks infrared communication is present between the system and the remote control, there are cases where the command cannot be received. Such a problem can likewise occur in a case where a command is transmitted from a remote control to a luminaire using infrared communication, and the luminaire performs pairing within the system with the command serving as a trigger.

In view of this, the present disclosure provides a luminaire, etc., capable of reliably performing pairing.

A luminaire according to an aspect of the present disclosure includes: a light source; a storage for storing sound wave data which is predetermined; a microphone that detects sound; a communication circuit that communicates with a master controller; and a controller that performs pairing of the luminaire with the master controller via the communication circuit, wherein the controller obtains sound wave data from the sound detected by the microphone, and performs the pairing when the sound wave data obtained matches the sound wave data stored in the storage.

Furthermore, a lighting system according to an aspect of the present disclosure includes: an information terminal that outputs a sound; a plurality of luminaires; and a master controller that controls the plurality of luminaires. Each of the plurality of luminaires is a luminaire including: a light source; a storage for storing sound wave data which is predetermined; a microphone that detects the sound outputted by the information terminal; a communication circuit that communicates with the master controller; and a controller that performs pairing of the luminaire with the master controller via the communication circuit. The controller obtains sound wave data from the sound detected by the microphone, and performs the pairing when the sound wave data obtained matches the sound wave data stored in the storage.

Furthermore, a pairing method in a lighting system according to an aspect of the present disclosure is a pairing method in a lighting system including an information terminal, a plurality of luminaires, and a master controller that controls the plurality of luminaires, the pairing method includes: outputting a sound toward a target luminaire out of the plurality of luminaires, using the information terminal; receiving, by the target luminaire, the sound outputted by the information terminal; and performing, by the target luminaire, pairing of the target luminaire and the master controller when sound wave data included in the sound matches sound wave data stored in advance in the particular luminaire.

Accordingly, pairing by a luminaire can be reliably performed.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 9 is a flowchart illustrating a pairing method in a lighting system according to Variation 2 of the exemplary embodiment.

DETAILED DESCRIPTION OF THE EMBODIMENTS

Hereinafter, lighting systems and luminaires according to exemplary embodiments will be described with reference to the drawings. It should be noted that each of the subsequently-described exemplary embodiments shows a specific example of the present disclosure. Therefore, numerical values, shapes, materials, structural components, the arrangement and connection of the structural components, etc. shown in the following exemplary embodiments are mere examples, and are not intended to limit the scope of the present disclosure. Therefore, among the structural components in the following exemplary embodiments, components not recited in any one of the independent claims which indicate the broadest concepts of the present disclosure are described as arbitrary structural components.

It should be noted that the drawings are schematic diagrams, and do not necessarily provide strictly accurate illustration. Furthermore, in the respective figures, substantially identical components are assigned the same reference signs, and overlapping description is omitted or simplified.

Embodiment

[1. Overall Configuration of Lighting System]

Figure 1A:
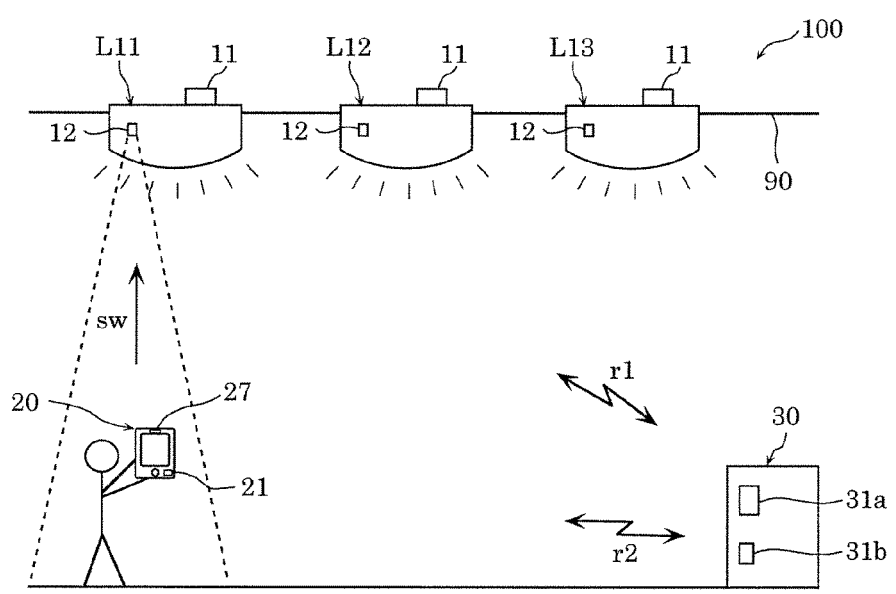
FIG. 1A is an outline diagram illustrating a lighting system according to an exemplary embodiment, and luminaires, a master controller, and an information terminal included in the lighting system.
Figure 1B:
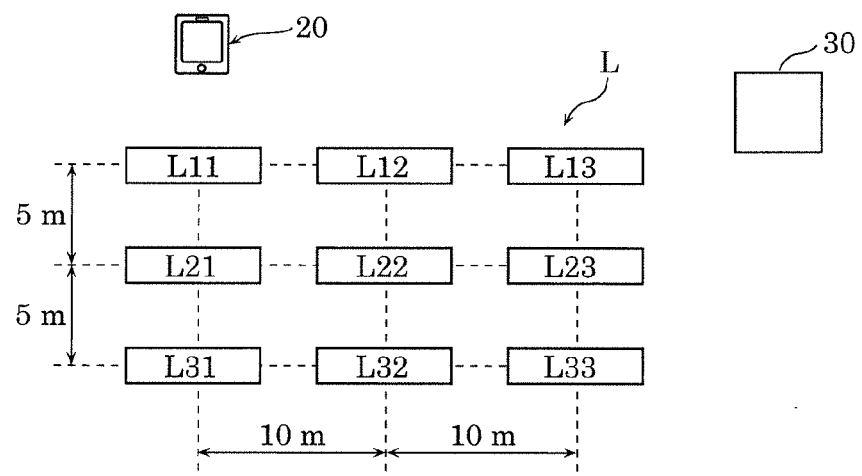
FIG. 1B is a luminaire layout diagram in the case where the luminaires according to the exemplary embodiment are viewed from above.

FIG. 1A is a diagram illustrating lighting system 100 according to this embodiment, and luminaires, master controller 30, and information terminal 20 included in lighting system 100. FIG. 1B is a luminaire layout diagram in the case where the luminaires are viewed from above.

Lighting system 100 includes a plurality of luminaires L11, L12, L13, L21, L22, L23, L31, L32, and L33, master controller 30, and information terminal 20. It should be noted that although three luminaires L11 to L13 are illustrated in FIG. 1A and nine luminaires L11 to L33 are illustrated in FIG. 1B, these drawings are merely examples and there are cases where, in actuality, more than 100 luminaires are mounted on ceiling 90, etc., of a building. Hereinafter, there are instances where luminaires L11 to L33 are generically referred to as luminaire L.

First, the communication system of luminaire L, master controller 30, and information terminal 20 included in lighting system 100 will be described with reference to FIG. 1A.

Communication is possible between each luminaire L and master controller 30 by radio r1. The communication system for radio r1 uses a specified low power radio system, such as Zigbee (registered trademark), Bluetooth (registered trademark), or WiFi (registered trademark), which uses a 920 MHz band or 2.4 MHz band frequency. It should be noted that luminaire L and master controller 30 may be capable of communicating with each other by forming a wired network.

Communication is possible between information terminal 20 and master controller 30 by radio r2. The communication system for radio r2 uses the same system as in radio r1. It should be noted that wired communication between information terminal 20 and master controller 30 may be enabled through the use of connection terminals such as a USB, etc.

Information terminal 20 outputs sound sw via speaker 27. Sound sw includes sound wave data which serves as a trigger for starting pairing between each luminaire L and master controller 30. Each luminaire L includes microphone 12 which detects sound sw outputted from information terminal 20. For example, as illustrated in FIG. 1B, luminaires L11 to L33 are arranged in rows and columns at 5 m and 10 m intervals to so as to be able to individually detect sound sw that was outputted.

In lighting system 100 according to this embodiment, by placing information terminal 20 near luminaire L11 for example, luminaire L11 obtains the sound wave data included in sound sw. Then, with the obtainment of the sound wave data as a trigger, luminaire L11 starts pairing with master controller 30.

[2. Respective Structural Components of Lighting System]

Next, luminaire L, information terminal 20, and master controller 30 included in lighting system 100 will be described.

Figure 2:
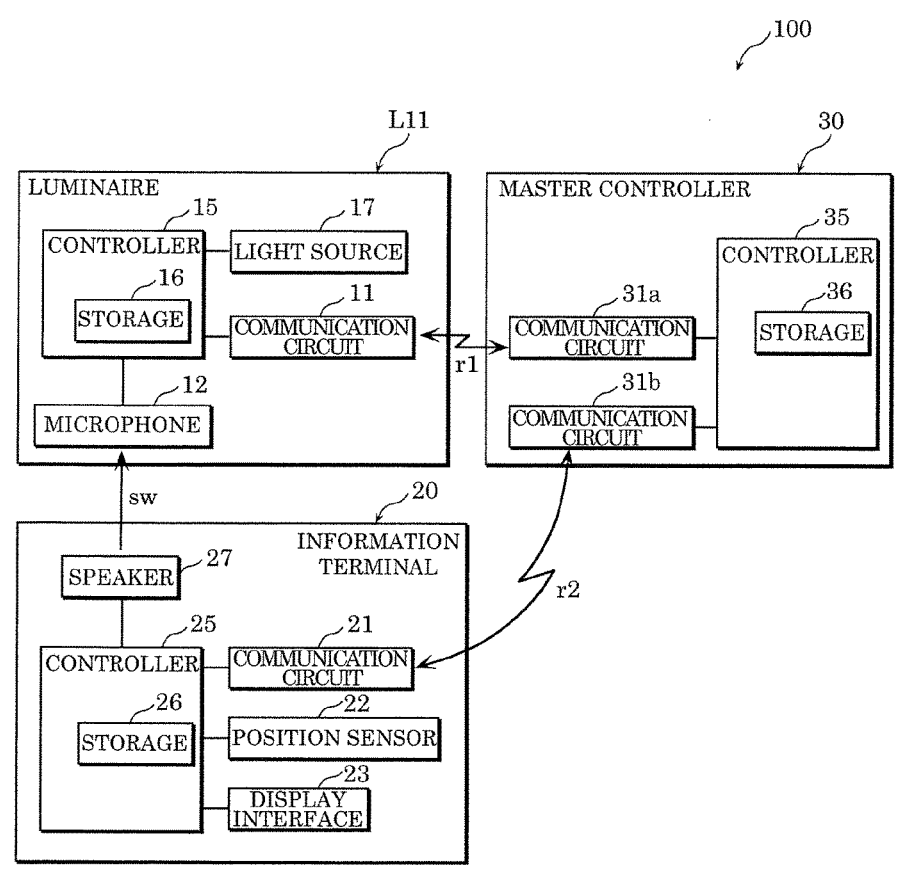
FIG. 2 is a block diagram illustrating a control configuration for the luminaires, the master controller, and the information terminal in the lighting system according to the exemplary embodiment.
Figure 3:
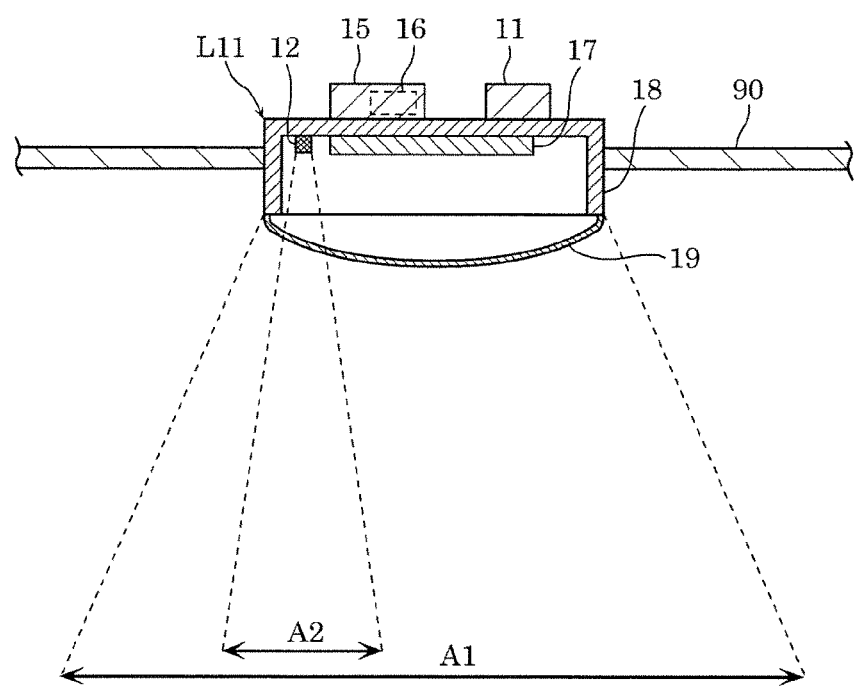
FIG. 3 is a cross-sectional view schematically illustrating a luminaire according to the exemplary embodiment.

FIG. 2 is a block diagram illustrating a control configuration for luminaire L11, information terminal 20, and master controller 30 in lighting system 100. FIG. 3 is a cross-sectional view schematically illustrating luminaire L11. It should be noted that, among luminaires L11 to L33, luminaire L11 is illustrated in FIG. 2 and FIG. 3 as a representative example.

As illustrated in FIG. 2, luminaire L11 includes controller 15 including storage 16, light source 17 connected to controller 15, communication circuit 11, and microphone 12.

Light source 17 includes a plurality of light emitting diodes which emit, for example, white light, red light, green light, or blue light. Luminaire L11 is, for example, a ceiling light, and is mounted on ceiling 90 which is an example of a building part of a building. It should be noted that luminaire L11 may be a rod-shaped light emitting diode (LED) light.

Furthermore, as illustrated in FIG. 3, luminaire L11 includes case 18 including an opening portion, and globe 19 provided in the opening portion of case 18. Case 18 is cylinder-shaped, and one end in the direction in which the cylinder shape extends is open. Furthermore, the other end located opposite the opening portion of case 18 is closed by the bottom portion of case 18. Light source 17 and microphone 12 are provided inside of case 18. Specifically, light source 17 and microphone 12 are provided on the bottom portion of case 18, and microphone 12 is placed beside light source 12. Controller 15 and communication circuit 11 are provided on the outside of case 18. It should be noted that controller 15 and communication circuit 11 may be provided inside of case 18.

A diffusing layer that diffuses the light emitted from light source 17 is formed in globe 19. Globe 19 is provided in case 18 to cover light source 17 and microphone 12. Stated differently, microphone 12 is provided on a side at which light source 17 is disposed, when viewed from globe 19.

As described earlier, microphone 12 detects sound sw outputted from information terminal 20. Microphone 12 has directivity and has detection area A2 which is the area within which sound sw can be detected. Detection area A2 is located within illumination area A1 of the light emitted from luminaire L11. In other words, microphone 12 is disposed such that detection area A2 for sound sw is located within illumination area A1 of the light.

Sound sw detected by microphone 12 is for example an audible sound of at least 20 Hz and at most 20 kHz. Sound sw includes sound wave data which serves as a trigger for starting pairing between luminaire L11 and master controller 30. Furthermore, microphone 12 can also detect the sound pressure of the sound wave data of detected sound sw.

Controller 15 performs dimming control and/or toning control of light source 17. Controller 15 includes a central processing unit (CPU), a random access memory (RAM) and a read only memory (ROM) included in storage 16, etc.

Identification information (ID) such as a media access control address (MAC address) or a unique device identifier (UDID), etc., of luminaire L11 are stored in storage 16. Furthermore, predetermined sound wave data is stored in storage 16. Sound wave data is data defined by a sound waveform or a frequency spectrum, and is written into storage 16 during manufacturing of luminaire L11. The sound wave data that is written into storage 16 is common for luminaires L11 to L33. It should be noted that the sound wave data stored in storage 16 is not limited to one type and may be different types of sound wave data.

Controller 15 obtains sound wave data from the sound detected by microphone 12. Specifically, controller 15 has a noise cancellation function, and cancels noise generated from the outside when obtaining sound wave data. Noise is, for example, indoor environmental sound of an air conditioner, etc. Controller 15 cancels noise by emitting a sound wave having an inverted phase. Furthermore, controller 15 may cancel noise using a band-pass filter to obtain the necessary sound wave data.

Controller 15 compares the sound wave data obtained and the sound wave data stored in storage 16, and performs pairing with master controller 30 when the sound wave data match. Pairing is performed via communication circuit 11 which includes an antenna, a radio module, etc. When performing pairing, controller 15 reads out the identification information (ID) stored in storage 16, and transmits the read-out identification information to master controller 30 via communication circuit 11. Furthermore, controller 15 receives the identification information of master controller 30 via communication circuit 11, and writes the received identification information into storage 16. In this manner, pairing is established when luminaire L11 and master controller 30 know each other's identification information.

Controller 15 causes light source 17 to emit light fully before performing the pairing with master controller 30; causes light source 17 to flicker during pairing so that, when seen from the surroundings, it can be recognized that pairing is ongoing; and causes light source 17 to stop emitting light when pairing is completed. In other words, when pairing is completed, controller 15 causes light source 17 to transition to a light emission state different from the light emission state before the pairing was performed.

Figure 4:
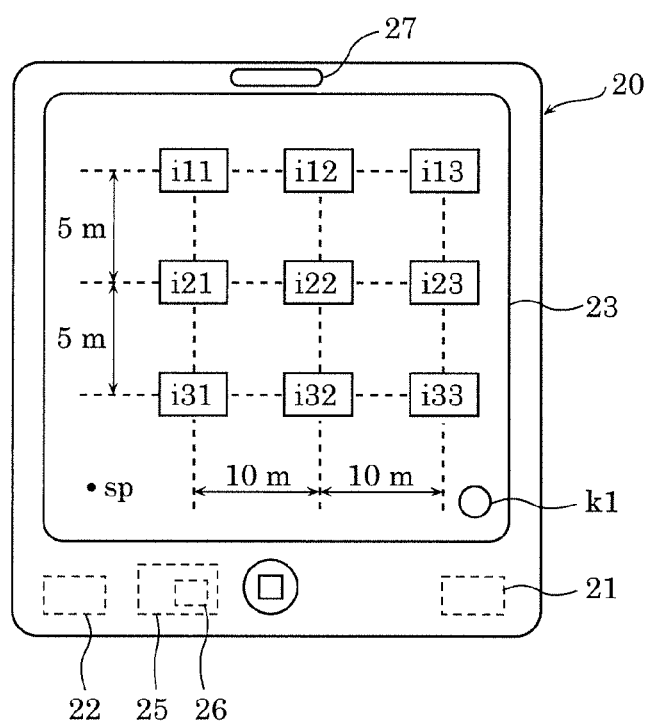
FIG. 4 is an outline diagram illustrating the information terminal according to the exemplary embodiment.

FIG. 4 is an outline diagram illustrating information terminal 20.

Information terminal 20 is for example a tablet terminal or a smartphone, and is a device that outputs sound sw which becomes a trigger for starting pairing, in this embodiment. Information terminal 20 includes controller 25 including storage 26, communication circuit 21 connected to controller 25, display interface 23, speaker 27, and position sensor 22.

Controller 25 includes a CPU, a RAM and a ROM included in storage 26, etc. Sound wave data which serves as a trigger for starting pairing between luminaire L11 and master controller 30 is stored in storage 26. Furthermore, the device numbers of luminaires L11 to L33 and layout information of luminaires L11 to L33 in the building, etc., are stored in storage 26.

Position sensor 22 is for example a global positioning system (GPS) sensor, and detects the position of information terminal 20 and outputs the position to controller 25. For example, by placing information terminal 20 directly below luminaire L11 and having position sensor 22 detect the position of information terminal 20, the position information of luminaire L11 for pairing can be outputted to controller 25.

Display interface 23 is for example a touch panel, and, as illustrated in FIG. 4, icons i11 to i33 are displayed in rows and columns, corresponding to the positions of luminaires L11 to L33 stored in storage 26. Furthermore, by using icons i11 to i33, the distance from a reference position sp in the building to luminaires L11 to L33, or the light emission state of luminaires L11 to L33, etc., is displayed on display interface 23.

Icons i11 to i33 are operation keys, and, by touching a certain icon i11, for example, luminaire L11 for pairing is selected. When operation key k1 of display interface 23 is pressed in a state where luminaire L11 is selected, sound sw is outputted from speaker 27.

Speaker 27 outputs sound sw including sound wave data. Sound sw outputted from information terminal 20 is a unidirectional communication, from information terminal 20 to luminaire L11. Sound sw outputted from speaker 27 is for example an audible sound of at least 20 Hz and at most 20 kHz, and includes the sound wave data stored in storage 26. Furthermore, sound sw includes part of address information such as the device number and position of luminaire L for pairing. In this manner, by using sound sw which has a diffraction property as a means for transmitting sound wave data and address information, the necessary sound wave data and address information can be transmitted even when there is an obstruction between information terminal 20 and luminaire L11.

Communication circuit 21 includes an antenna, a radio module, etc. Controller 25 can communicate with master controller 30 via communication circuit 21. After pairing is completed, information terminal 20 receives the address information of luminaire L11 and master controller 30, from master controller 30. The address information includes the device number, position, and identification information of luminaire L11 and the identification information of master controller 30 (see FIG. 7).

Master controller 30 is a management server that performs the light emission control of each luminaire L. As illustrated in FIG. 2, master controller 30 includes controller 35 including storage 36, and communication circuits 31a and 31b which are connected to controller 35. It should be noted that communication circuits 31a and 31b may be provided outside the body of master controller 30.

Controller 35 includes a CPU, a RAM and a ROM included in storage 36, etc. In the pairing with luminaire L, the identification information of master controller 30 is read out from storage 36 and the address information of luminaire L is written into storage 36.

Communication circuit 31a communicates with each luminaire L using radio r1. When pairing is performed, controller 35 obtains the address information of luminaire L11 which is the pairing partner and transmits the identification information of master controller 30 to luminaire L11 which is the pairing partner, via communication circuit 31a.

Communication circuit 31b communicates with information terminal 20 using radio r2. When the pairing is completed, controller 35 transmits the address information obtained from each luminaire L and the identification information of master controller 30 to information terminal 20 via communication circuit 31b. Accordingly, address information can be shared between master controller 30 and information terminal 20.

[3. Pairing Method in Lighting System]

Next, the pairing method in lighting system 100 will be described in detail.

Figure 5:
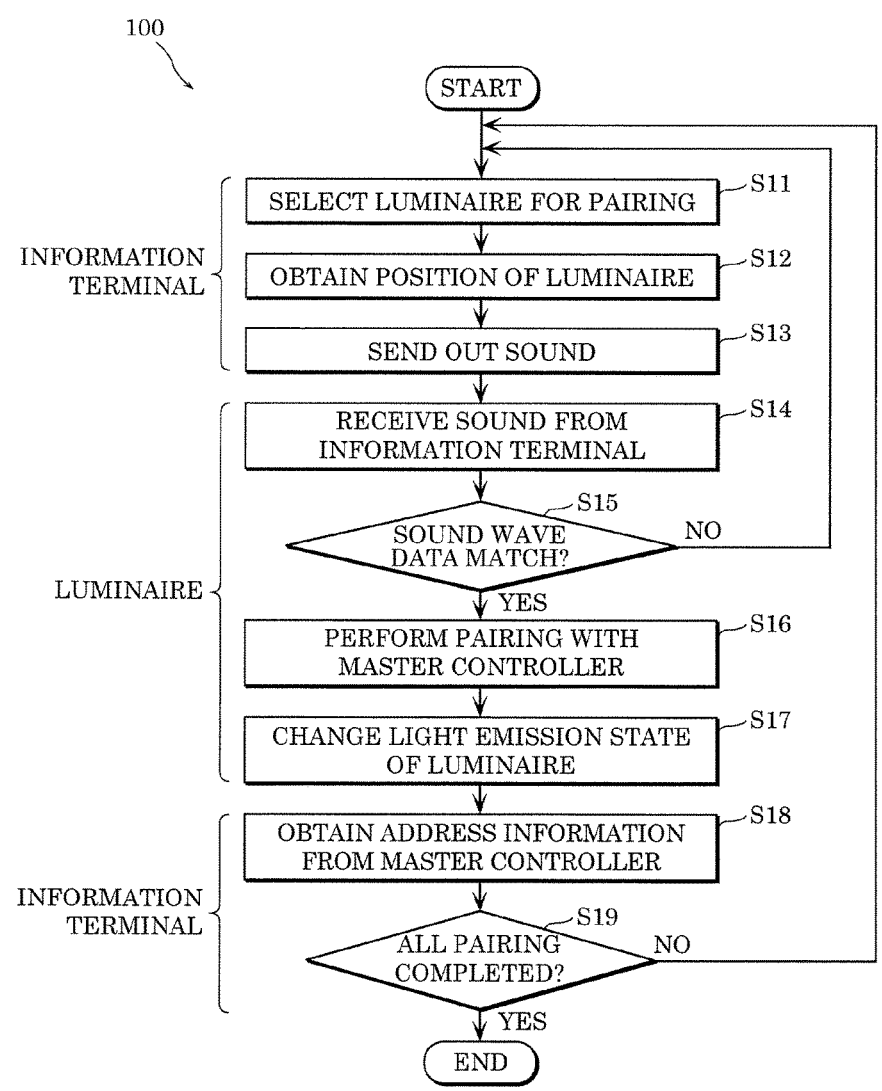
FIG. 5 is a flowchart illustrating a pairing method in the lighting system according to the exemplary embodiment.
Figure 6:
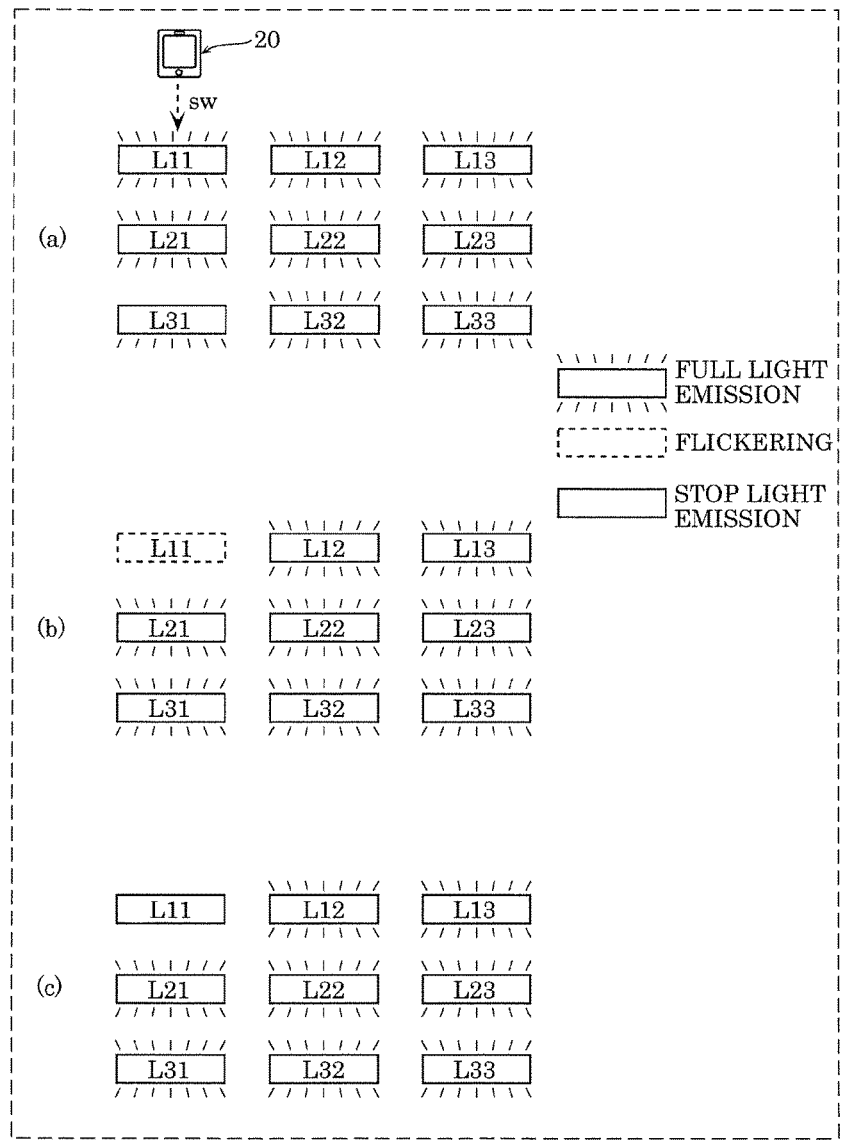
FIG. 6 is a diagram illustrating light emission states of the luminaires illustrated in FIG. 1B.

FIG. 5 is a flowchart illustrating the pairing method in lighting system 100. FIG. 6 is a diagram illustrating the light emission state of luminaires L11 to L33, and illustrates the light emission state of each luminaire L before pairing starts (a), during pairing (b), and after pairing is completed (c).

When power to luminaire L is turned ON after luminaire L is mounted onto ceiling 90, luminaire L is placed in the full light emission state, as illustrated in (a) in FIG. 6. In this stage, master controller 30 does not know the identification information of each luminaire L and cannot control the light emission of luminaire L. In view of this, in the process flow illustrated in FIG. 5, pairing is performed between master controller 30 and each luminaire L so as to enable light emission control of luminaire L.

First, luminaire L for pairing is selected using information terminal 20 (S11). Furthermore, the position information of selected luminaire L is obtained (S12). For example, the user touches icon i11 displayed on information terminal 20 in the state where information terminal 20 is located directly below luminaire L11 (see FIG. 1A). Consequently, luminaire L11 corresponding to icon i11 is selected. Furthermore, by touching icon i11, the current position of information terminal 20 is detected by position sensor 22. Since information terminal 20 is located directly below luminaire L11, the position detected by position sensor 22 can be considered as the position of luminaire L11. This enables lighting system 100 to obtain the position information of luminaire L11 which was selected.

Figure 7:
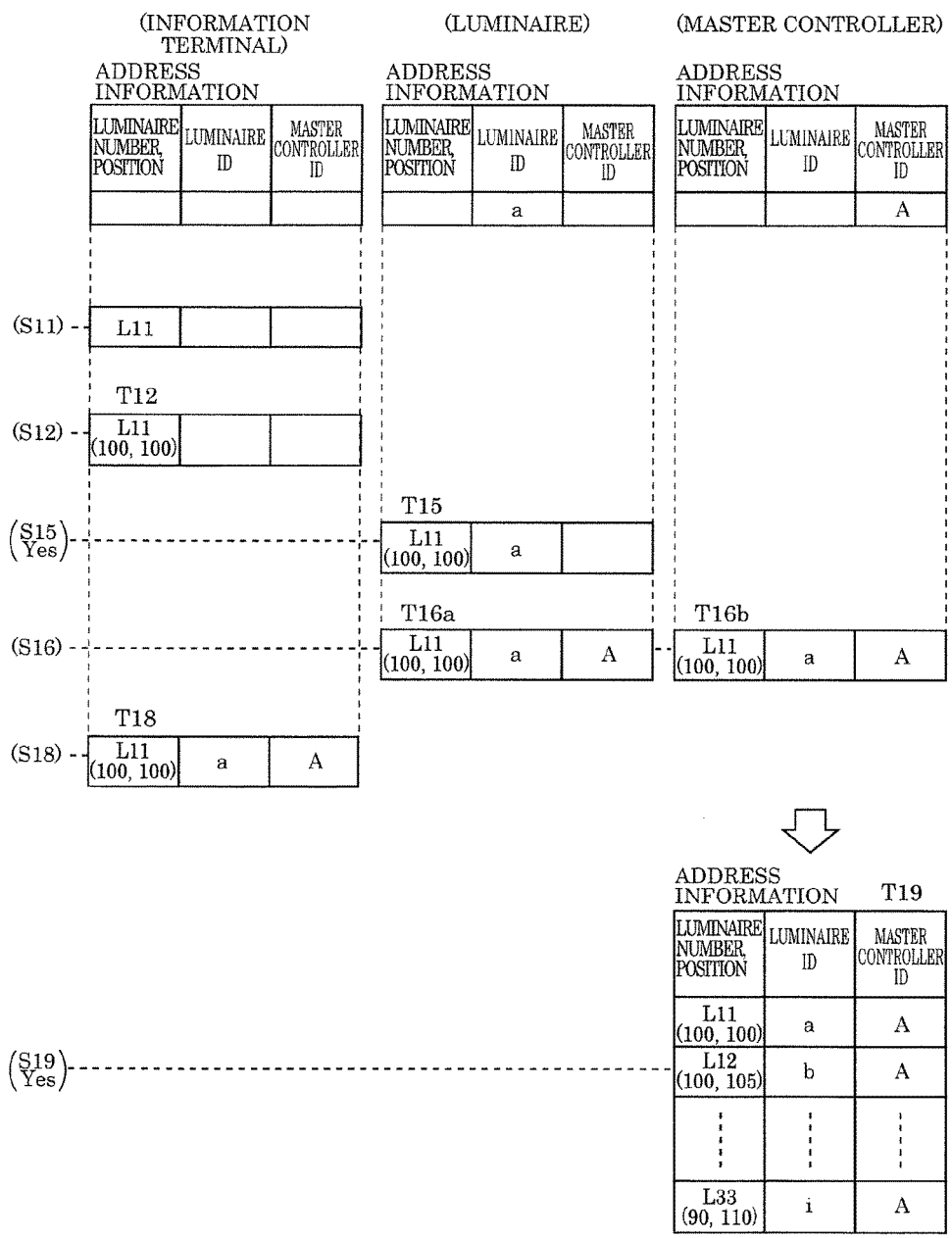
FIG. 7 is a diagram illustrating address information stored in each of the information terminal, the luminaires, and the master controller according to the exemplary embodiment.

FIG. 7 is a diagram illustrating address information stored in each of information terminal 20, luminaires L11 to L33, and master controller 30. As illustrated in tables T12 to T19 in FIG. 7, the address information includes the device number, the position, and the identification information of luminaire L, as well as the identification information of master controller 30, etc. The device number of luminaire L is a number determined by the user for distinguishing between each luminaire L. The position of luminaire L is the position of luminaire L obtained based on the position of position sensor 22.

At the stage where step S12 is finished, information regarding the device number and position of luminaire L, out of the address information, is stored in information terminal 20. For example, as illustrated in table T12 in FIG. 7, in information terminal 20, information such as "L11" is stored as the device number of luminaire L11 and "(100, 100)" is stored as the position of luminaire L11.

Next, operation key k1 of information terminal 20 is pressed, and sound sw is outputted to luminaire L11 (S13). As described earlier, sound sw includes predetermined sound wave data. Furthermore, sound sw includes information regarding the device number and position of luminaire L11.

Next, luminaire L11 receives sound sw outputted from information terminal 20 (S14). Specifically, microphone 12 of luminaire L11 detects sound sw outputted from information terminal 20, and controller 15 obtains the sound wave data from sound sw detected by microphone 12. When noise is included in sound sw which is detected, controller 15 cancels the noise and extracts the necessary sound wave data.

Next, controller 15 determines whether the sound wave data obtained matches the sound wave data stored in advance in storage 16 (S15). Whether or not the sound wave data match can be determined by comparing their sound waveforms or frequency spectra. When the sound wave data do not match (No in S15), pairing is not performed.

When the sound wave data match (Yes in S15), controller 15 accepts the information regarding the device number and position of luminaire L11 included in sound sw, and stores such information in storage 16 (see table T15 in FIG. 7). Furthermore, when the sound wave data match, controller 15 starts the pairing with master controller 30 (S16). As illustrated in (b) in FIG. 6, during pairing, luminaire L11 transitions to a light emission state different from the initial state by flickering, changing color temperature, changing brightness, etc., to indicate that pairing is ongoing.

In order to perform pairing, controller 15 transmits device number "L11" and position "(100, 100)" of luminaire L11 as well as identification information "a" of luminaire L11 to master controller 30 via communication circuit 11. Furthermore, master controller 30 transmits identification information "A" of master controller 30 to luminaire L11 via communication circuit 31a. In this manner, by having luminaire L11 and master controller 30 transmit their identification information to each other, the pairing between luminaire L11 and controller 30 is established (see tables T16a and T16b in FIG. 7).

When the pairing is completed, luminaire L11 changes light emission state (S17). Specifically, as illustrated in (c) in FIG. 6, controller 15 changes the light emission state of light source 17 to a state different from the state when pairing was ongoing, to enable the user to visually recognize luminaire L11 for which pairing has been completed.

Next, information terminal 20 obtains address information from master controller 30 (S18).

Specifically, information terminal 20 obtains, from master controller 30, device number "L11", position "(100, 100)", and identification information "a" of luminaire L11, and identification information "A" of master controller 30, in an associated state, as address information. Then, controller 25 stores the obtained address information in storage 26, and displays the address information on display interface 23.

Here, description will be carried out for the case where information regarding only the device number of luminaire L11 is included in sound sw.

In this case, steps S11 to S16 are the same as described above, and, as illustrated in (b) in FIG. 6, during pairing, luminaire L11 transitions to a light emission state different from the initial state by flickering, changing color temperature, changing brightness, etc., to indicate that pairing is ongoing.

In order to perform pairing, controller 15 transmits device number "L11" and identification information "a" of luminaire L11 to master controller 30 via communication circuit 11. Furthermore, master controller 30 transmits identification information "A" of master controller 30 to luminaire L11 via communication circuit 31a. Subsequently, master controller 30 communicates with information terminal 20 using radio r2 to obtain position information (for example, position "(100, 100)" of luminaire L11), and thus pairing is established.

When the pairing is completed, luminaire L11 changes light emission state (S17). Specifically, as illustrated in (c) in FIG. 6, controller 15 changes the light emission state of light source 17 to a state different from the state when pairing was ongoing, to enable the user to visually recognize luminaire L11 for which pairing has been completed.

Next, information terminal 20 obtains address information from master controller 30 (S18).

Specifically, information terminal 20 obtains, from master controller 30, device number "L11", position "(100, 100)", and identification information "a" of luminaire L11, and identification information "A" of master controller 30 in an associated state, as address information. Then, controller 25 stores the obtained address information in storage 26, and displays the address information on display interface 23.

Here, description returns to the flowchart in FIG. 5, and the next step will be described.

In the next step, it is determined whether pairing is completed for all luminaires L (S19). When pairing is not completed (No in S19), pairing with master controller 30 is performed by performing steps S11 to S18 on another luminaire L (for example, L12 to L33) different from luminaire L for which pairing is completed (for example L11). When all pairing has been completed (Yes in S19), the pairing in lighting system 100 ends. Accordingly, as illustrated in table T19 in FIG. 7, the address information of all luminaires L is stored in master controller 30, and master controller 30 can control the light emission of luminaire L based on the address information.

[4. Advantageous Effects, Etc.]

Luminaire L (for example, luminaire L11) according to this embodiment includes light source 17, storage 16 for storing sound wave data which is predetermined; microphone 12 that detects sound sw; communication circuit 11 that communicates with master controller 30; and controller 15 that performs pairing with master controller 30 via communication circuit 11. Controller 15 obtains sound wave data from sound sw detected by microphone 12, and performs the pairing when the sound wave data obtained matches the sound wave data stored in storage 16.

Accordingly, since luminaire L11 includes microphone 12, the sound wave data included in sound sw can be obtained, and pairing between luminaire L11 and master controller 30 can be performed with the sound wave data serving as a trigger. For example, even when sound sw outputted from the outside is obstructed by an obstruction or outputted toward a direction that is somewhat different from luminaire L11, pairing can be reliably performed by using sound sw.

Furthermore, luminaire L11 may further include globe 19 disposed to cover light source 17. Microphone 12 may be provided on a side at which light source 17 is disposed, when viewed from globe 19, and globe 19 may cover light source 17 and microphone 12.

Accordingly, microphone 12 becomes unobtrusive, and thus it is possible to prevent imparting a feeling of unpleasantness to people.

Furthermore, microphone 12 may have directivity and may be disposed such that detection area A2 in which microphone 12 detects sound sw is within illumination area A1 of light from luminaire L11.

Accordingly, sound sw outputted from the outside, for example, can be reliably detected using microphone 12.

Furthermore, when pairing is completed, controller 15 may cause light source 17 to transition to a light emission state different from the light emission state before the pairing is performed.

Accordingly, the user can visually recognize luminaire L for which pairing has been completed.

Furthermore, controller 15 may cancel noise from sound sw detected by microphone 12 when obtaining the sound wave data.

In this manner, by cancelling noise, controller 15 can reliably obtain the sound wave data.

Furthermore, luminaire L11 may further include case 18 including an opening portion. Light source 17 and microphone 12 may be disposed inside case 18, and globe 19 may be disposed in the opening portion.

Furthermore, light source 17 and microphone 12 may be disposed in a bottom portion of case 18, which is located opposite the opening portion, and microphone 12 may be disposed beside light source 17.

Furthermore, sound sw detected by microphone 12 may be an audible sound of at least 20 Hz and at most 20 kHz.

System 100 according to this embodiment includes information terminal 20 that outputs sound sw, a plurality of luminaires L, and master controller 30 that controls the plurality of luminaires L. Each of the plurality of luminaires L includes: light source 17; storage 16 for storing sound wave data which is predetermined; microphone 12 that detects sound sw outputted by information terminal 20; communication circuit 11 that communicates with master controller 30; and controller 15 that performs pairing with master controller 30 via communication circuit 11. In each of the plurality of luminaires L, controller 15 obtains sound wave data from sound sw detected by microphone 12, and performs the pairing when the sound wave data obtained matches the sound wave data stored in storage 16.

In this manner, since each luminaire L of lighting system 100 includes microphone 12, it is possible to obtain the sound wave data included in sound sw, and pairing between each luminaire L and master controller 30 can be performed with the sound wave serving as a trigger. For example, even when sound sw outputted from the outside is obstructed by an obstruction or outputted toward a direction that is somewhat different from luminaire L, pairing can be reliably performed by using sound sw.

Furthermore, information terminal 20 (i) may include position sensor 22 that detects a position of information terminal 20, and (ii) may output position information of each of the plurality of luminaires L obtained based on position information of position sensor 22, by including the position information in sound sw, and in each of the plurality of luminaires L, controller 15 may transmit the position information of luminaire L included in sound sw detected by microphone 12 to master controller 30 via communication circuit 11.

In this manner, by transmitting the position information of luminaire L to master controller 30, master controller 30 can control the light emission state of luminaire L in a state where master controller 30 is aware of the position of luminaire L.

Furthermore, information terminal 20 (i) may include position sensor 22 that detects a position of information terminal 20, and (ii) may output position information of each of the plurality of luminaires L obtained based on position information of position sensor 22, according to a request from master controller 30, to transmit the position information of each of the plurality of luminaires L to master controller 30.

Information terminal 20 need not necessarily transmit the position information of luminaire L obtained based on position information of position sensor 22 to master controller 30 via luminaire L, and may transmit such position information directly to master controller 30 according to a request from master controller 30. For example, in step S15 in FIG. 5, the position information of luminaire L need not be transmitted to luminaire L. Instead, in step S18, master controller 30 may request for the position information of luminaire L simultaneously when transmitting address information to information terminal 20, and information terminal 20 may transmit the position information of luminaire L to master controller 30 in response to the request. In this manner, by transmitting the position information of luminaire L to master controller 30, master controller 30 can control the light emission state of luminaire L in a state where master controller 30 is aware of the positions of luminaire L.

Pairing method in lighting system 100 according to this embodiment is a pairing method in lighting system 100 including information terminal 20, a plurality of luminaires L, and master controller 30 that controls the plurality of luminaires L, the pairing method includes: outputting sound sw toward target luminaire L11 out of the plurality of luminaires L, using the information terminal; and receiving sound sw outputted by information terminal 20, and performing pairing of target luminaire L11 and master controller 30 when sound wave data included in sound sw matches sound wave data stored in advance in target luminaire L11, the receiving of sound sw and the performing of the pairing being performed by target luminaire L11.

Accordingly, it is possible to obtain the sound wave data included in sound sw and perform the pairing between luminaire L11 and master controller 30 with the sound wave data serving as a trigger. For example, even when sound sw outputted from the outside is obstructed by an obstruction and is outputted to a direction that is somewhat different from luminaire L11, pairing can be reliably performed by using sound sw.

[5. Variation 1 of the Foregoing Embodiment]

Next, lighting system 100A according to Variation 1 of the foregoing embodiment will be described. In lighting system 100A according to Variation 1, pairing is performed when the position of luminaire L11 for pairing matches the position of luminaire L11 which is based on layout information. Accordingly, reliability of pairing can be enhanced.

Figure 8:
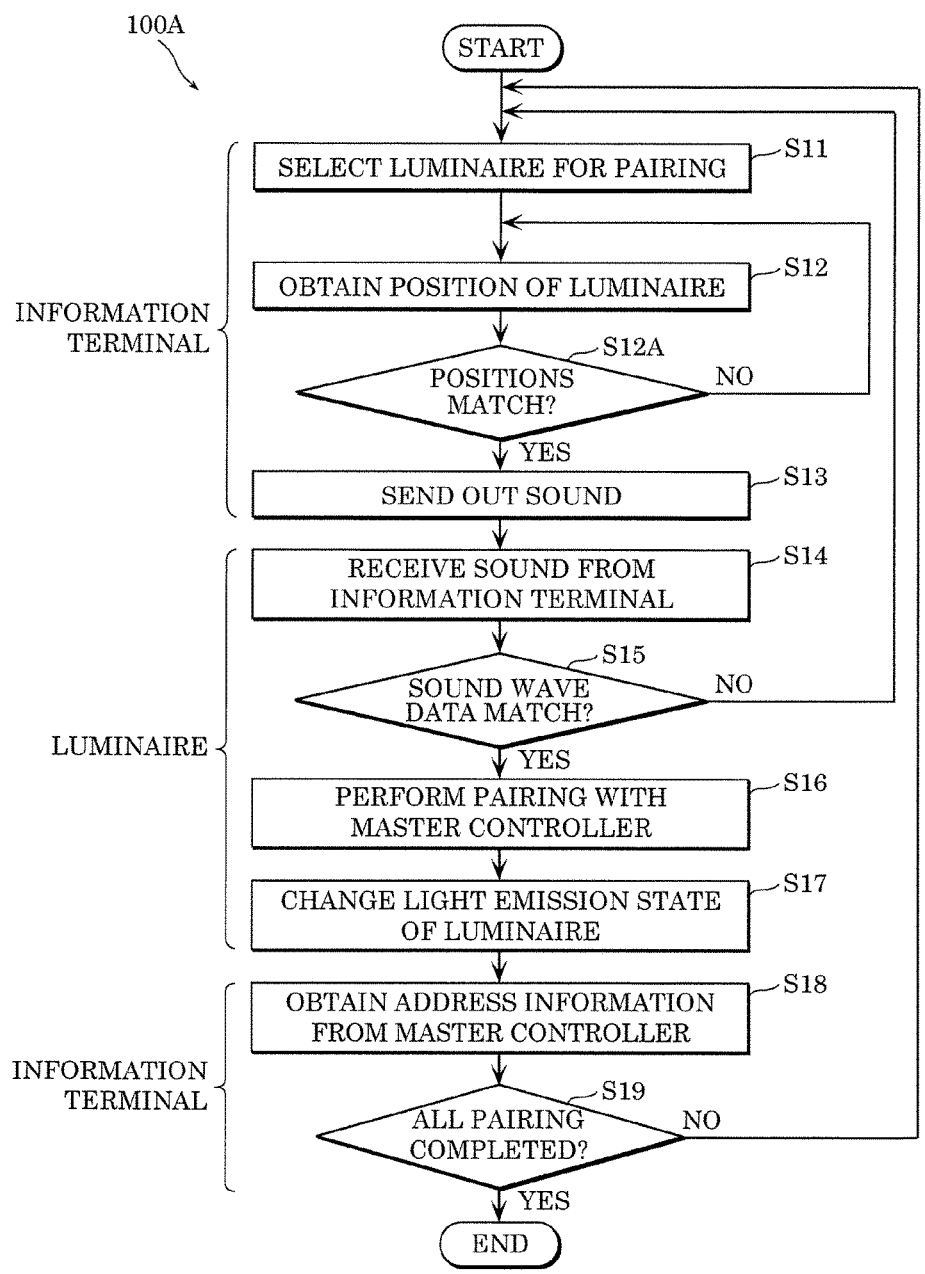
FIG. 8 is a flowchart illustrating a pairing method in a lighting system according to Variation 1 of the exemplary embodiment.

FIG. 8 is a flowchart illustrating the pairing method in lighting system 100A.

First, in lighting system 100A, luminaire L11 for pairing is selected using information terminal 20 (S11). Furthermore, the position information of selected luminaire L11 is obtained (S12).

Next, controller 25 of information terminal 20 determines whether the position of luminaire L11 for pairing matches the position of luminaire L11 which is based on layout information (S12A). Specifically, controller 25 determines whether the position of selected luminaire L11 which is obtained by position sensor 22 matches the position of luminaire which is based on layout information stored in storage 26. When the positions do not match each other (No in S12A), controller 25 does not cause speaker 27 to output sound sw.

On the other hand, when the positions match each other (Yes in S12A), controller 25 causes speaker 27 to output sound sw which includes sound wave data (S13). Hereinafter, steps S14 to S19 are executed in the same manner as in lighting system 100 in the foregoing embodiment.

In lighting system 100A according to Variation 1 of the foregoing embodiment, information terminal 20 includes position sensor 22 which detects the position of information terminal 20, and controller 15 of luminaire L11 performs pairing when the position information of luminaire L11 obtained based on the position information of position sensor 22 and the position information of luminaire L11 obtained from the layout information of the plurality of luminaires L in the building match.

In this manner, since pairing is performed after confirming whether the position information of luminaire L11 based on position sensor 22 matches the position information of luminaire L11 based on the layout information, providing master controller 30 with position information of the wrong luminaire L can be prevented.

It should be noted that although, in Variation 1, information terminal 20 determines whether the position information of luminaire L11 based on both position sensor 22 and the layout information match, such determining may be performed by luminaire L11. For example, information on whether the positions of luminaire L11 match may be outputted by being included in sound sw, and controller 15 may determine whether the positions of luminaire L11 match based on the information included in sound sw, and perform pairing when the positions match and not perform pairing when the positions do not match.

[6. Variation 2 of the Foregoing Embodiment]

Next, lighting system 100B according to Variation 2 of the foregoing embodiment will be described. In lighting system 100B in Variation 2, when a plurality of luminaires L detect sound sw, pairing is performed with luminaire L from which highest sound pressure is obtained. Accordingly, reliability of pairing is enhanced.

FIG. 9 is a flowchart illustrating the pairing method in lighting system 100B.

First, luminaire L11 for pairing is selected using information terminal 20 (S11). Furthermore, the position information of selected luminaire L11 is obtained (S12). Next, information terminal 20 outputs sound sw toward luminaire L11 (S13).

Here, the case where two luminaires L11 and L12 both detect sound sw is described as an example. Next, luminaires L11 and L12 simultaneously receive sound sw outputted from information terminal 20 (S14). In Variation 2, controller 15 obtains sound wave data from sound sw detected by microphone 12, and further obtains sound pressure from the sound wave data.

Next, in each of luminaires L11 and L12, controller 15 determines whether the sound wave data obtained matches the sound wave data stored in advance in storage 16 (S15).

Next, when the sound wave data match, each of luminaires L11 and L12 requests master controller 30 to perform pairing, via their respective communication circuits 11. Then, master controller 30 determines whether pairing requests are received from a plurality of luminaires L (S15A). Here, the process moves to step S16 when it is determined that pairing requests are not received from a plurality of luminaires L (No in S15A), and moves to step S15B when it is determined that pairing requests are received from a plurality of luminaires L (Yes in S15A). In this variation, master controller 30 receives a signal regarding a pairing request from each of the two luminaires L11 and L12, and thus the process moves to step 15B. It should be noted that the signals regarding the pairing requests include information regarding the sound wave data of sound sw and the sound pressure which are detected by luminaires L11 and L12.

Next, master controller 30 compares the sound pressures included in the signals regarding the pairing requests of luminaires L11 and L12, and takes the luminaire L having the higher sound pressure (S15B). For example, in the case where information terminal 20 outputs sound sw while being located directly below luminaire L11, higher sound pressure is obtained from luminaire L11 than L12, and thus luminaire L11 is taken as a pairing candidate.

Next, master controller 30 performs pairing with luminaire L11 that was taken as a candidate (S16). Hereinafter, steps S17 to S19 are executed in the same manner as in lighting system 100 in the foregoing embodiment.

In lighting system 100B according to Variation 2 of the foregoing embodiment, controller 15 of luminaire L obtains the sound pressure of the sound wave data included in sound sw, and transmits information regarding the sound pressure to master controller 30 via communication circuit 11. When master controller 30 obtains information regarding sound pressure from a plurality of luminaires L, master controller 30 performs pairing with the luminaire L (for example, luminaire L11) from which highest sound pressure is obtained, out of the plurality of luminaires L.

In this manner, when a plurality of luminaires L detect sound sw which serves as a trigger for pairing, pairing is performed with the luminaire L from which highest sound pressure is obtained, and thus pairing with luminaire L that is different from the intended luminaire L can be prevented. Furthermore, when the position information of luminaire L is also transmitted during pairing, providing wrong position information to master controller 30 can be prevented.

(Other Embodiments)

Although lighting systems 100, 100A, and 100B and luminaire L have been described thus far based on the foregoing exemplary embodiments, the present disclosure is not limited to the foregoing exemplary embodiments. For example, forms obtained by various modifications to the foregoing exemplary embodiments that can be conceived by a person of skill in the art as well as forms realized by arbitrarily combining structural components and functions in the foregoing exemplary embodiments, which are within the scope of the essence of the present disclosure are included in the present disclosure.

In lighting system 100 according to the foregoing embodiment, luminaire L is selected in step S11, and then sound sw is outputted by pressing operation key k1 of information terminal 20 in step S13, but is not limited to such. For example, when icon ill is touched in step S11, information terminal 20 may obtain the position information of luminaire L using position sensor 22, and output the obtained position information by including the obtained position information in sound sw.

In lighting system 100, pairing is performed when sound wave data match each other in step S15, but is not limited to such. For example, when controller 15 of luminaire L obtains sound pressure that is less than or equal to a certain threshold, controller 15 may determine not to perform pairing. Furthermore, when master controller 30 obtains sound wave data from luminaire L and the sound pressure of the sound wave data is less than or equal to a certain threshold, master controller 30 may determine not to perform pairing.

What is claimed is:

1. A lighting system, comprising:
an information terminal that outputs a sound;
a plurality of luminaires; and
a master controller that controls the plurality of luminaires, wherein:
each of the plurality of luminaires is a luminaire including:
a light source;
a storage for storing sound wave data which is predetermined;
a microphone that detects the sound outputted by the information terminal;
a communication circuit that communicates with the master controller; and
a controller that performs pairing of the luminaire with the master controller via the communication unit,
the controller obtains sound wave data from the sound detected by the microphone, and performs the pairing when the sound wave data obtained matches the sound wave data stored in the storage,
the information terminal
includes a position sensor that detects a position of the information terminal, and
outputs position information of each of the plurality of luminaires obtained based on position information of the position sensor, by including the position information in the sound, and
the controller transmits the position information of the luminaire included in the sound detected by the microphone to the master controller via the communication circuit.

2. A lighting system, comprising:
an information terminal that outputs a sound;
a plurality of luminaires; and
a master controller that controls the plurality of luminaires, wherein:
each of the plurality of luminaires is a luminaire including:
a light source;
a storage for storing sound wave data which is predetermined;
a microphone that detects the sound outputted by the information terminal;
a communication circuit that communicates with the master controller; and
a controller that performs pairing of the luminaire with the master controller via the communication unit,
the controller obtains sound wave data from the sound detected by the microphone, and performs the pairing when the sound wave data obtained matches the sound wave data stored in the storage,
the information terminal
includes a position sensor that detects the position of the information terminal, and
outputs position information of each of the plurality of luminaires obtained based on position information of the position sensor, according to a request from the master controller, to transmit the position information of each of the plurality of luminaires to the master controller.

3. A lighting system, comprising:
an information terminal that outputs a sound;
a plurality of luminaires; and
a master controller that controls the plurality of luminaires, wherein:
each of the plurality of luminaires is a luminaire including:
a light source;
a storage for storing sound wave data which is predetermined;
a microphone that detects the sound outputted by the information terminal;
a communication circuit that communicates with the master controller; and
a controller that performs pairing of the luminaire with the master controller via the communication unit,
the controller obtains sound wave data from the sound detected by the microphone, and performs the pairing when the sound wave data obtained matches the sound wave data stored in the storage,
the information terminal includes a position sensor that detects a position of the information terminal, and
the controller performs the pairing when position information of the luminaire obtained based on position information of the position sensor matches position information of the luminaire obtained from layout information of the plurality of luminaires in a building.

4. A lighting system, comprising:
an information terminal that outputs a sound;
a plurality of luminaires; and
a master controller that controls the plurality of luminaires, wherein:
each of the plurality of luminaires is a luminaire including:
a light source;
a storage for storing sound wave data which is predetermined;
a microphone that detects the sound outputted by the information terminal;
a communication circuit that communicates with the master controller; and
a controller that performs pairing of the luminaire with the master controller via the communication unit,
the controller obtains sound wave data from the sound detected by the microphone, and performs the pairing when the sound wave data obtained matches the sound wave data stored in the storage, the controller obtains sound pressure of the sound wave data included in the sound, and transmits information regarding the sound pressure to the master controller via the communication circuit, and when the master controller obtains the information regarding the sound pressure from the plurality of luminaires, the master controller performs pairing with a luminaire, out of the plurality of luminaires, from which highest sound pressure was obtained.

* * * * *